Jan. 29, 1924.
E. A. FORD
1,481,795
FUEL MIXING MEANS FOR INTERNAL COMBUSTION ENGINES
Filed March 7, 1921
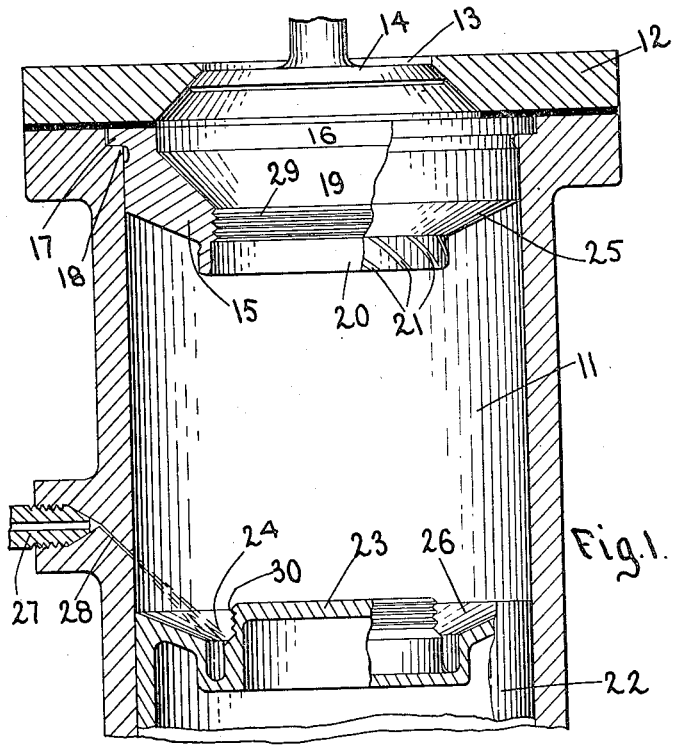
Fig.1.
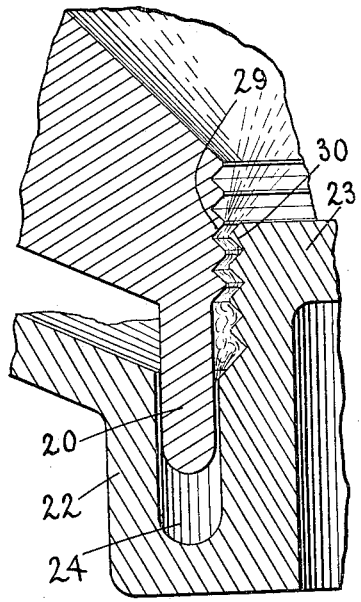
Fig.2
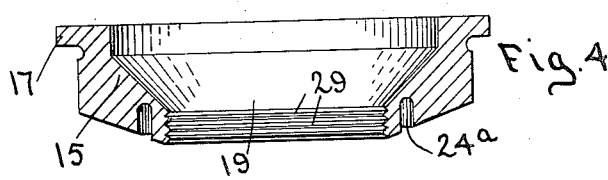
Fig.4
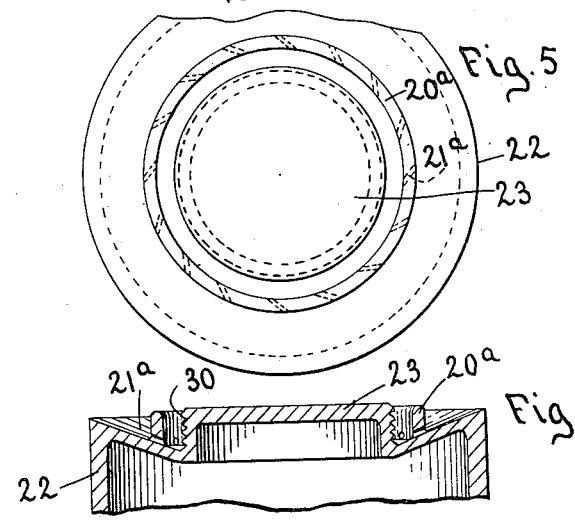
Fig.5
Fig.6
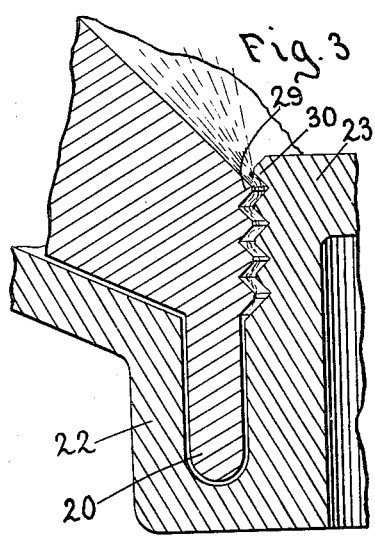
Fig.3
INVENTOR
Eugene A Ford
by Wright, Bryan
Attys Patented Jan. 29, 1924.

1,481,795

UNITED STATES PATENT OFFICE.

EUGENE A. FORD, OF NEWTON, MASSACHUSETTS, ASSIGNOR TO R. E. D. ENGINE COMPANY, INC., OF NEW YORK, N. Y., A CORPORATION OF NEW YORK.

FUEL-MIXING MEANS FOR INTERNAL-COMBUSTION ENGINES.

Application filed March 7, 1921. Serial No. 450,446.

*To all whom it may concern:*

Be it known that I, EUGENE A. FORD, a citizen of the United States, residing at Newton, in the county of Middlesex and State of Massachusetts, have invented new and useful Improvements in Fuel-Mixing Means for Internal-Combustion Engines of which the following is a specification.

The present invention relates to internal combustion engines of the high compression type, in which pure air and liquid fuel are separately admitted, the air so admitted is compressed until its temperature becomes high enough to ignite such fuel, and the liquid fuel is mixed with and ignited by the air so compressed. My object has been to effect a more thorough vaporization of the liquid fuel and a more intimate mixing of the particles of the fuel, whether vaporized or unvaporized, with the air, prior to the ignition of the fuel, than has been accomplished by prior engines of this class, to the end that a greater thermal efficiency, and a higher rate of speed in the running of the engine, may be obtained than has been possible heretofore. This object is accomplished by means which will be explained with particular reference to specific embodiments thereof which are described in the following specification and illustrated in the drawings therein referred to.

In said drawings,—

Figure 1 is a longitudinal axial section of the cylinder and piston of an internal combustion engine equipped with one form of my fuel mixing and disintegrating means.

Figures 2 and 3 are fragmentary sectional views on an enlarged scale illustrating the operation of said means in two stages of such operation.

Figure 4 is an axial section of an annular partition adapted to the head end of the cylinder containing another specific embodiment of the principle illustrated in the preceding figures.

Figures 5 and 6 are, respectively, a plan view and a sectional view of the head of a piston complemental to the cylinder head shown in Figure 4.

Like reference characters indicate the same parts in all the figures wherever they occur.

I will first describe in detail the embodiments of the invention here shown and then explain the mode of operation thereof and the principles exemplified thereby.

11 represents a cylinder and 12 represents the head of such cylinder having a port 13 controlled by a valve 14 for admission of air and discharge of spent gases. Within the head end of the cylinder is an annular member 15, which I have called for the purpose of this description a partition, which partially separates a combustion chamber 16 from the main body of the space within the cylinder. Said annular partition member is formed externally to fit the bore of the cylinder and it has on its end a flange 17 resting on a shoulder 18 at the end of the cylinder and overlaid by the head 12 by which the partition is secured in place. The open interior space of the partition furnishes a passage 19 between the combustion chamber and the cylinder proper. A cylindrical rib 20, surrounding the passage 19, projects from the partition toward the cylinder head. In the outer surface of this rib are helical, or otherwise suitably inclined, grooves or channels 21.

The engine here shown is designed to operate in a vertical position, and is so shown in this drawing, wherefore, for convenience in the following description, the relation of the various parts and the operation will be described with reference to that position but without intending thereby to indicate any other limitation than is required for an operative combination.

A piston 22 is arranged to reciprocate in the cylinder in the usual manner, and has on its head a boss or plug-like projection 23 which is adapted to enter the passage 19 when the piston is at the head end of its stroke. An annular groove 24 surrounds this boss in position to receive the rib 20 at the same time. The dimensions and positions of the passage 19, boss 23, rib 20 and groove 24 are such that sufficient clearance is left between the adjacent surfaces of these members, when the piston is at the head end of its stroke, for air to flow around the rib 20 in groove 24, and past the boss 23 in the passage 19, into the combustion chamber. The surface 25 of the partition outside of the rib 20, and the opposed surface 26 of the piston head outside of the groove 24 are substantially complemental to each other and are preferably conical with the same degree of downward slant.

Liquid fuel is supplied to the engine by a pipe 27 which is connected to the side of the cylinder and opens into a passageway 28 arranged at a downward slant in position to direct the injected oil against the piston head outside of the boss 23 when the piston is at a low point in its travel. Suitable means are provided for injecting measured quantities of fuel at the proper times, and as pumps or equivalent supplying means and timing mechanisms suitable for the purpose are already known in the art, and known types of such means and mechanisms may be used with my engine, I have not deemed it necessary to illustrate any such apparatus in this specification. Preferably the fuel injection is timed to occur when the piston is about to reverse its travel at the end of its filling stroke and the inlet passage 28 is so placed and directed as to cause the fuel to lodge on the piston head outside of the boss at that time. I prefer that the fuel should be thrown as nearly as possible into the groove 24.

Any of the fuels which are or can be used with high compression engines may be used in my engine, and those which under conditions existing at the present day would be most commonly used are crude oil, fuel oil and kerosene.

On the inner wall of the passage 19 are parallel ribs 29; and on the outer wall or surface of the boss 23 are parallel ribs 30. These ribs preferably have inclined sides and are in planes perpendicular to the axis of the cylinder. That is, they are not helical or inclined, but each rib is a complete annulus, forming a closed body of revolution.

In now describing the operation of the engine, I will assume that it is designed to operate on the four stroke cycle. At the end of the suction stroke, during which a charge of pure air has been drawn in, fuel is admitted and deposited on the head of the piston, as shown in Figure 1. On the compression stroke the air contained in the cylinder is equally compressed in the parts of the cylinder, including the combustion chamber, until the piston has risen to the point where the rib 20 begins to enter the groove 21. Then the air in the outer part of the cylinder is imprisoned in a narrow annular space, of which the volume is reduced, with continued travel of the piston, more rapidly than the volume in the combustion chamber, and from which the only outlet is through the narrow spaces between the rib 20 and groove 24 and between the boss 23 and walls of the passage 19. These spaces are made narrow enough to restrict the flow of the air entrapped in the outer space between the cylinder and partition, whereby a higher compression occurs in such outer space and a rapid flow of air takes place therefrom around the obstruction caused by the rib 20 and boss 23 into the combustion chamber. A considerable proportion of air so flowing travels through the inclined grooves 21 and is given a whirling motion thereby, and this whirling motion acts to distribute the fuel previously deposited on the piston head. Of course, a certain distribution of the fuel thus deposited takes place previously by gravity, but the amount of the charge is so small that gravity alone is not effective to distribute it evenly in the short time of the piston stroke.

By properly designing the outer circumference of the rib 20 to fit more or less closely within the opposed wall of the groove 24, and providing the inclined channels 21 in the proper number and with the proper depth, it is possible to secure whatever rapidity of circular flow of the air in the groove 24 may be needed to effect a thorough distribution of the fuel. This rotary motion is checked by the inner wall of the groove 24 and by the opposed ribs 29 and 30, for such ribs when opposite to one another (that is, when one or more of the ribs 30 is in the same plane with one or more of the ribs 29) obstruct the flow passage, and, when the ribs of one set are in the same planes with the spaces between the ribs of the other set, the passage is widened. Hence the mixture of air and fuel flowing up into the combustion chamber is alternately checked and released, whereby the rotational velocity of said mixture is dissipated.

The ribs 29 and 30 have the further effects of more completely mixing the air and fuel and of distributing the mixture throughout the combustion chamber. In accomplishing these effects they act alternately as baffles and deflectors, as is shown diagrammatically by Figures 2 and 3. When the ribs of one set are opposite the intermediate grooves of the other set, the annular passage is a zigzag one, whereby the air stream is thrown back and forth and is thoroughly mixed, and the issuing stream is guided, by the conical upper side of the uppermost rib 30 on the piston and the complemental surface of the adjacent rib on the partition, in a cone-shaped path toward the axis of the combustion chamber, as shown in Figure 2. When the piston reaches the end of its stroke, the topmost rib thereon is above the topmost rib of the partition, and then the orifice of the annular passage is a flaring cone which directs the stream outwardly along the walls of the combustion chamber, as shown in Figure 3. When the ribs are passing one another the passageway is then reduced in width but is not entirely closed, and the flow takes place in an axial direction with augmented velocity due to the restriction of the passage. Thus during the greater part of the period when air flows into the combustion chamber, the flow is alternately directed toward the axis and parallel with the axis, and at the last instant of flow the stream is directed outwardly; thus effecting a thorough distribution of the fuel and mixture thereof with the air.

In the course of the compression stroke the temperature of the air rises and a certain degree of heat is thereby given to the fuel lying on the piston head before the transfer of air in the manner just described begins. When the transferal takes place the air is highly heated and it vaporizes the fuel to a greater or less extent at the same time that the latter is mechanically disintegrated. Ignition of the air and fuel mixture is then caused by the high temperature of compression; but the combustion is substantially confined to the chamber 16 because the relatively large proportion of fuel to air in the groove 24 makes a mixture there which is too rich to burn. By properly designing the length of the rib 20 and depth of the groove 24, combustion may be caused to begin at the desired instant within the range of time in which ignition is possible.

The engine may, however, be equipped with electrical or other supplemental ignition means, and may then be operated with a lower pressure of compression than that which is essential for self-ignition.

A modification involving the same principles and mode of operation above described is shown in Figures 4, 5 and 6, in which a rib 20$^a$, corresponding to the rib 20, is formed upon the cylinder head surrounding the central boss thereof, and a groove 24$^a$ complemental to the rib 20$^a$ and corresponding in function to the groove 24 is formed in the partition surrounding the passage therethrough. An alternative form of means for creating a circular flow of air in contact with the liquid fuel consists in holes or passages 21$^a$ through the rib 20$^a$ at or close to the base of said rib, said holes being tangential to a circle concentric with the rib. When the rib 20$^a$ enters the groove 24$^a$, such of the air entrapped between said rib and the cylinder walls as does not flow around the rib passes through these holes and gives a rotary motion to the imprisoned air, distributing the fuel and facilitating its intimate mixture with the air. A somewhat similar arrangement of holes may be provided through the rib 20 instead of the grooves 21, but the construction having such grooves is preferable owing to the fact that this arrangement conducts the rotatably traveling air directly down to the bottom part of the annular recess 24. Otherwise the construction shown in Figures 1, 2 and 3 is preferable to that shown in Figures 4, 5 and 6, because the first construction accomplishes a better preliminary mixture of fuel and air and leaves no pockets or corners which are not swept by a rapid current of air in which the liquid fuel may lodge.

It will be appreciated from the foregoing explanation that my invention provides a means by which a preliminary mixture of the liquid fuel and air is secured before any of the fuel passes into the combustion chamber; that when the fuel enters the combustion chamber it is already vaporized to some extent and is thoroughly distributed in a finely divided condition; that it enters the combustion chamber in an annular jet surrounding the center of the combustion chamber and is well within the circumference thereof; that the direction of the annular stream of mixed air and fuel changes in the course of its flow, whereby a wide distribution of the fuel throughout the combustion chamber is accomplished; and that the surfaces on which the liquid fuel may impinge or lodge, and the spaces through which the fuel passes, are swept by an air current of such high velocity that there is no possibility of the fuel gathering permanently anywhere or of the passages becoming clogged.

Owing to the thorough disintegration and distribution of the fuel thus effected, it is possible to secure complete combustion with a smaller excess of air than has been previously required in engines of the high compression type; and the same conditions make it possible to effect a closer and more sensitive governing of the supply of fuel in proportion to the load of the engine, and to run the engine at a higher speed without waste of fuel.

What I claim and desire to secure by Letters Patent is:

1. In an internal combustion engine, a cylinder, a piston arranged to reciprocate in said cylinder, a partition in the upper part of the cylinder delimiting a combustion chamber from the main interior space of the cylinder, and means for delivering liquid fuel upon the upper end of the piston between the cylinder wall and the entrance to said combustion chamber; the piston end having a depressed portion to receive the fuel, and the partition being complementally formed to enter said depressed portion when the piston approaches the end of its compression stroke, whereby to cause air then entrapped in the intermediate space to carry the fuel with it in its flow to said combustion chamber.

2. In an internal combustion chamber, a cylinder, an interior partition delimiting the combustion chamber within one end of said cylinder, a piston reciprocating in said cylinder and having a projection adapted to enter said combustion chamber, and means for delivering liquid fuel into the cylinder and upon the head of the piston when the latter is displaced from said partition.

3. An internal combustion engine comprising a cylinder and a piston, the cylinder having an annular partition near the head end and the piston having a projection arranged to pass through the interior opening of said partition when the piston approaches the head end of the cylinder, and a fuel admission port in the side of the cylinder arranged to be uncovered by the head end of the piston when the latter is withdrawn from the partition.

4. An internal combustion engine comprising a cylinder having an internal annular partition, a piston having a head opposed to said partition, a boss on said head adapted to enter and withdraw from the passage through said partition, one of the members comprised by the partition and piston head having a rib projecting toward the other, and the other member having an annular recess adapted to receive said rib; the rib and recess being arranged to surround the said passage and projection; and means for delivering fuel into the space between said members.

5. An internal combustion engine comprising a cylinder, a piston therein, an annular partition disposed in the cylinder to delimit a combustion chamber at one end thereof, means for introducing fuel into the cylinder and upon the piston outside of the inner circumference of said partition, and cooperating means on the piston and partition arranged to imprison air in an annular zone, said means being constructed to cause flow of the imprisoned air in an annular jet into the combustion chamber and to cause a preliminary mixture of said air with the liquid fuel.

6. An internal combustion engine comprising a cylinder and a piston, there being an annular partition in the cylinder and the piston having a projection adapted to enter the passage in said partition, said projection and the wall of said passage having parallel surrounding ribs whereby the intervening space is alternately reduced and widened in effective area during the travel of the piston.

7. An internal combustion engine comprising a cylinder and a piston, the cylinder having an annular partition and the piston having a projection similar to the passage through said partition adapted to enter and withdraw therefrom in the normal operation of the engine, and the surrounding wall of said passage and the complemental surface of said projection being provided with substantially parallel surrounding ribs having inclined faces, whereby during the travel of said projection through the passage the intervening space between the surrounding walls and the projection is alternately narrowed and widened and the direction of the terminal part of such space is altered.

8. In an internal combustion engine, a cylinder, a piston, and an annular partition defining a combustion chamber at one end of the cylinder with a passage opening into the main space of the cylinder, a rib projecting toward the piston from said partition and surrounding said passage, a projection on the piston head similar in outline to said passage and of dimensions adapting it to enter the passage without wholly closing the same, and the piston having an annular recess surrounding said projection and adapted to receive said rib with clearance for flow of air therethrough around the rib, and fuel admitting means arranged to discharge liquid fuel against the piston head beside said projection, said rib having inclined channels in its outer face to cause a revolving movement of the air which flows around the rib when the piston approaches the partition closely enough to receive said rib in its annular recess.

9. In an internal combustion engine, a cylinder, a piston, and an annular partition defining a combustion chamber at one end of the cylinder with a passage opening into the main space of the cylinder, a rib projecting toward the piston from said partition and surrounding said passage, a projection on the piston head similar in outline to said passage and of dimensions adapting it to enter the passage without wholly closing the same, and the piston having an annular recess surrounding said projection and adapted to receive said rib with clearance for flow of air therethrough around the rib, and fuel admitting means arranged to discharge liquid fuel against the piston head beside said projection, one of the opposed faces of said rib and annular recess having inclined channels arranged to cause a revolving movement of the air which flows around the rib when the piston approaches the partition so nearly that the rib enters the annular recess.

In testimony wherof I have affixed my signature.

EUGENE A. FORD.